UNITED STATES PATENT OFFICE 2,385,933

UNSATURATED ALCOHOL ESTERS OF TRIETHYLENE GLYCOL BIS(ACID CARBONATE) AND POLYMERS THEREOF

Irving E. Muskat, Akron, and Franklin Strain, Norton Center, Ohio, assignors to Pittsburgh Plate Glass Company, Pittsburgh, Pa., a corporation of Pennsylvania No Drawing. Application March 7, 1942, Serial No. 433,834

8 Claims. (Cl. 260—78)

This invention relates to a new class of unsaturated esters having valuable uses as herein described. The new compounds are polyesters of (a) triethylene glycol and (b) a half ester of carbonic acid and an unsaturated alcohol.

The new compounds are esters of unsaturated alcohols, preferably those which contain three to five carbon atoms and an unsaturated linkage in an aliphatic chain, such as allyl, methallyl, 2-ethylallyl, crotyl, isocrotyl, tiglyl, angelyl, isopropenyl alcohols, methylvinyl carbinol, propargyl alcohol, 2-chloroallyl alcohol, butadienyl alcohol, divinyl carbinol, chlorocrotyl alcohol, dimethyl vinyl carbinol, methyl propargyl, alcohols, etc. Although the lower alcohol esters are preferred, the esters of unsaturated alcohols containing six to ten carbon atoms for example, geraniol, linalool, cinnamyl alcohol, phenyl-propargyl alcohol, 1-hydroxyhexadiene-2,4, propylallyl alcohol, n-octenol, chlorocinnamyl alcohol, etc., may be used.

The new unsaturated esters have the structure:

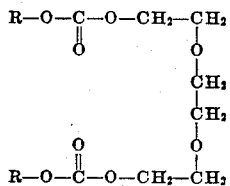

in which R is the radical of an unsaturated alcohol.

The new esters may be prepared by treating the triethylene glycol with phosgene at temperatures between 0° C. and 20° C. by bubbling the gas through the glycol in a reaction flask submerged in a cooling medium such as ice-salt or dry ice-acetone mixtures. The resulting dichloroformate of triethylene glycol is then reacted with an unsaturated alcohol in the presence of pyridine or other cyclic tertiary amine or a carbonate, oxide, or hydroxide of an alkaline or alkaline earth metal. The same esters may alternatively be prepared by reacting phosgene with the unsaturated alcohol and subsequently reacting the resulting chloroformate with triethylene glycol.

Although the chloroformate and the hydroxy compounds are preferably reacted at subnormal temperatures higher temperatures may be used, especially when insoluble alkaline reagents are used, for example, CaCO₃. The reactions are preferably conducted in liquid phase with a stirring device to insure homogeneous mixture of reagents and uniform reaction conditions. When either the ester or an intermediate product is a solid at the reaction temperature it may be desirable to conduct the reaction in the presence of a solvent or diluent such as benzene, xylene, acetone, chloroform, or carbon tetrachloride.

The new unsaturated carbonates are generally non-resinous compounds having distinct boiling and melting points and are often capable of separation in substantially pure state. Frequently, the impurities are side reaction products which are colorless and transparent esters having characteristics similar to the esters herein contemplated. In some cases removal of the impurities may be unnecessary where they do not produce any detrimental effect in the use of the ester. The new compounds are usually liquids at room temperature but some, however, are solids. The new unsaturated compounds are usually miscible with solvents such as benzene, toluene, chloroform, diethyl ether, carbon tetrachloride, and petroleum ether. The monomeric esters are valuable as plasticizers for various resin materials such as styrene, cellulose, vinyl, urea, protein, phenolic, or acrylic resins. Other uses such as solvents, insecticides, and liquid coating compositions are noteworthy.

These esters may be polymerized in the presence of heat, light, or catalysts such as oxygen, ozone, or organic peroxides such as lauroyl, benzoyl, and acetone peroxides to yield solid or liquid compositions of widely differing physical properties. The polymerized products vary in properties, depending upon the structure of the ester and upon the degree of polymerization.

The polyunsaturated esters contain at least two radicals derived from unsaturated alcohol and are capable of polymerization to a fusible intermediate stage and finally to a substantially infusible and/or insoluble form. The completely polymerized polyunsaturated compounds are, in general, substantially unaffected by acids, alkalies, water, and organic solvents. Intermediate polymers derived from the polyunsaturated esters having a wide range of properties may be secured by incomplete polymerization. The polymers thus obtained are transparent and colorless, although they may at times have a slightly yellow cast, especially when polymerized completely. Many of these new polymers are generally tougher and more resistant to shattering than are the unsaturated alcohol esters of polybasic acids.

Upon the initial polymerization of the polyunsaturated esters in liquid monomeric state or in a solution of the monomer in suitable solvents, an increase in the viscosity of the liquids is noticeable due to the formation of a simple polymer which is soluble in the monomer and in solvents such as acetone, benzene, xylene, dioxane, toluene, or carbon tetrachloride. Upon further polymerization, the liquid sets up to form a soft gel containing a substantial portion of a polymer which is insoluble in the monomer and organic solvents and containing as well, a substantial portion of a soluble material which may be monomer and/or soluble fusible polymer. These gels are soft and bend readily. However, they are fragile and crumble or tear under low stresses. They may be further polymerized in the presence of catalysts to the final infusible, insoluble state in which substantially all of the polymer is substantially infusible and substantially insoluble in organic solvents, acid, and alkalies.

The monomers of the polyunsaturated esters may be cast polymerized directly to the substantially insoluble, infusible state. This procedure is subject to certain inherent difficulties due to the strains which are established during polymerization of the gel and which frequently result in fractures as the final hard form is attained. It has been discovered that these difficulties may be avoided by releasing the strains established in the gel before the fracturing can occur. This may be done by permitting the strains to be relieved before the polymerization is complete, either periodically or by conducting the polymerization under conditions which permit gradual release of these strains. For example, the polymerization may be conducted in a simple mold until a soft firm gel has formed. At this point the polymer may be freed from the mold to which it adheres strongly. When released the polymer contracts substantially, thereby relieving the polymerization strains. The gel may thereafter be shaped, if desired, and polymerized to the final infusible state. Smooth, optically perfect sheets may be made by this method. Preferably, the initial polymerization is conducted at a temperature sufficiently low to prevent the complete decomposition of the peroxide catalyst. This temperature is dependent upon the catalyst used. For benzoyl peroxide, temperatures of 65 to 80° C. are suitable, while for acetone peroxide, temperatures of 140–150° C. may be used. In accordance with one modification, the gel, after it is freed from the mold, may be coated on both sides with monomer or the syrupy polymer. The coated article is then polymerized between smooth heated plates to the final insoluble state.

In order to inhibit formation of cracks during the initial polymerization, it is frequently desirable to minimize the polymerization on one side of the sheet. This is done by conducting the polymerization with one side exposed to the air which inhibits polymerization in the presence of a peroxide catalyst, such as benzoyl peroxide. Thus, a sheet is produced which is hard and smooth on one side while being soft and tacky on the other. The sheet may then be finished by coating the tacky side with monomer or syrupy polymer and polymerizing it in contact with a smooth plate to the insoluble, infusible state. Often it is found desirable to release the polymer from the plate one or more times during polymerization of the coating in order to minimize formation of cracks or other surface defects.

Cast polymers may also be prepared by a single step polymerization directly to the insoluble infusible state. The monomer may be mixed with one to five percent of benzoyl or other organic peroxide and heated at 50–60° C. until it becomes partly polymerized and thickened to an increased viscosity of 100 to 1000 percent of the monomer viscosity. The thickened monomer may then be polymerized between glass, metal, or similar plates which are separated by compressible gaskets or retainers of Koroseal (plasticized polyvinylchloride), butadiene polymer, polyvinyl alcohol, Thiokol (polyethylene sulfide), rubber, or similar materials arranged about the edge of such plates. The thickened monomer may be poured on one glass plate within the confines of the flexible retainer, laid about 2 inches from the edge of the plate. The second glass plate may then be carefully laid on top, taking care to avoid the trapping of air bubbles under the top plate. When the top plate is in position, both plates may be held together by means of suitable clamps which are capable of applying pressure upon the plates and are placed directly over the flexible retainer. The entire assembly is then placed in an oven and heated at 70 to 100° C. where the polymerization is continued. During the polymerization the resin shrinks and tends to draw away from the glass surfaces. To prevent fractures pressure is maintained upon the plates to depress the flexible container and permit the plates to remain in contact with the polymerizing resin. This pressure may be maintained by periodically tightening the clamps or by use of spring clamps which maintains a uniform pressure throughout the polymerization process.

By an alternative procedure for cast polymerizing sheets, the molds may be assembled before the thickened monomer is poured. Thus, the flexible compressible retainer may be inserted between the plates and held in place by suitable clamps located around the edge of the plates. This retainer or gasket is placed adjacent the edge of the plates and a suitable opening may be provided between the ends of the flexible retainer, preferably at one corner of the mold. The assembled mold is then placed in a vertical position with the open corner uppermost. The thickened monomer containing one to four percent residual peroxide is then poured in slowly until the entire mold is filled. After standing until all of the entrapped air has separated the mold is heated uniformly between 70 and 100° C. to continue the polymerization. Pressure is maintained upon the plates to insure the contact of glass and resin during polymerization by suitable means such as by tightening the clamps periodically or by maintaining a uniform pressure upon the plates throughout by means of spring clamps. When the resin has been completely polymerized it is separated from the glass plates and a hard, transparent, colorless, and durable resin sheet is obtained.

Other methods have been developed for polymerization of the compounds herein contemplated while avoiding formation of cracks and fractures. By one of these methods the polymerization may be suspended while the monomer-polymer mixture is in the liquid state and before the polymer is converted to a gel by cooling, removal from exposure to ultraviolet light, by adding inhibiting materials such as pyrogallol, hydroquinone, aniline, phenylene diamine, or sulphur, or by destruction of the polymerization catalyst. The fusible polymer may be separated from all or part of the monomer by any of several methods. It may be precipitated by the addition of nonsolvents for the fusible polymer such as water, ethyl alcohol, methyl alcohol, or glycol.

Alternatively, it may also be separated from the monomer by distillation in the presence of an inhibitor for polymerization and preferably at reduced pressures. The fusible polymer is thus obtained in stable solid form and as such may be used as a molding powder or may be redissolved in suitable solvent for use in liquid form. It is soluble in organic solvents which are normally capable of dissolving methyl methacrylate polymer or similar vinyl type polymer. Preferably, the polymers of the new polyunsaturated esters are produced by heating the monomer or a solution thereof in the presence of substantial quantities, for example, 2 to 5 percent of benzoyl peroxide until the viscosity of the solution has increased about 100 to 500 percent. This may require from one-half to two hours while heating at 65 to 85° C. in the presence of benzoyl peroxide. The resulting viscous solution is poured into an equal volume of water, methyl or ethyl alcohols, glycol or other nonsolvent for the fusible polymer. A polymer usually in the form of a powder or a gummy precipitate is thus formed which may be filtered and dried. This permits substantially complete separation of a soluble fusible polymer from unpolymerized monomer.

Often, however, such complete separation is not desirable since hazy products may be secured upon further polymerization. Accordingly, it is often desirable to produce compositions comprising the fusible polymer and the monomer. This may be effected by partial distillation or extraction of monomer from the polymer or by reblending a portion of the fusible polymer with the same or a different polymerizable monomer. In general, the composition should contain at least 40 percent and preferably in excess of 50 percent fusible polymer and also may contain from about 5 percent to 50 or 60 percent monomer.

Preferably, the production of these materials is conducted by treatment of a solution of the monomer in a solvent for monomer and polymer such as benzene, xylene, toluene, carbon tetrachloride, acetone, or other solvent which normally dissolves vinyl polymers.

Other polymerization methods may involve the interruption of the polymerization while the polymer is a gel. For example, a soft solid gel containing a substantial portion of fusible polymer may be digested with a quantity of solvent for the fusible polymer to extract the fusible gel from the infusible. The solution may then be treated as above described to separate the fusible polymer from the solvent. These polymers may be used as molding or coating compositions. Due to their solubility, they are particularly desirable for use in paint compositions.

Other fusible polymers may be prepared by carrying the initial polymerization to the point where the polymer is in the form of a gel which generally contains at least 20 percent and preferably about 45 to 80 percent by weight of substantially insoluble polymer, but at which point the gel is still fusible. This solid resin composition may be disintegrated to a pulverulent form and used as a molding powder. Alternatively, then, a desirable polymer may be prepared by emulsifying the monomer or a syrupy polymer in an aqueous medium with or without a suitable emulsification agent such as polyvinyl alcohol, polyallyl alcohol, etc., and then polymerizing to the point where the gel precipitates. This polymer may be separated and used as molding powder.

The solid forms of the fusible polymers may be used as molding compositions to form desirable molded products which may be polymerized to thermo hardened state. Preferably, the molding is conducted in a manner such that the polymer fuses or blends together to form a substantially homogeneous product before the composition is polymerized to a substantially infusible state. This may be effected by conducting polymerization at an elevated temperature and/or pressure in the presence of benzoyl peroxide, generally in a heated mold. The polymers may be mixed with fillers such as alpha cellulose, wood pulp, and other fibrous substances, mineral fillers or pigments such as zinc oxide, calcium carbonate, lead chromate, magnesium carbonate, calcium silicate, etc.; plasticizers, such as the saturated alcohol esters of phthalic acid, camphor, the saturated alcohol esters of maleic, fumaric, succinic, and adipic acids or di-, or triethylene glycol bis (butyl carbonate). The polymeric molding powder may be copolymerized with phenolic, cellulose acetate, urea, vinylic, protein, or acrylic resins, and it is thus possible to produce transparent or opaque forms of a wide variety of colors and hardnesses, depending upon the proper selection of the modifying agents.

The fusible polymers may be dissolved in suitable solvents, and used as coating and impregnating compositions. For example, the solution or dispersion of fusible polymer in monomer or other organic solvent such as benzene, toluene, chloroform, acetone, dioxane, carbon tetrachloride, phenyl cellosolve, dichlorethyl ether, dibutyl phthalate, or mixtures thereof, is useful as a liquid coating composition. Objects of paper, metal, cloth, wood, leather, or synthetic resins may be coated with the solution of polymer in solvent and subsequently is polymerized to yield attractively finished coatings. Similarly, porous objects of felt, cloth, leather, paper, etc., either in single layers or laminated, may be impregnated with the dissolved fusible polymer and subjected to polymerization to the final insoluble infusible state. Other molding powders may be prepared from the new esters without first converting them to the intermediate polymer. The monomer may be mixed directly with a suitable filler such as magnesium carbonate, cellulose pulp, asbestos, etc., in a ball mill or other mixing device. By proper selection of proportions a dry pulverulent powder can be obtained which is capable of polymerization under the influence of heat and pressure to a glossy solid polymer of high tensile strength. The use of too much filler will cause a non-glossy finish and the use of too much monomer will make the powder moist and difficult to handle. Sometimes it may be desirable to precure the molding powder by subjecting it to a moderate temperature, 50 to 70° C. for a limited period of time, for example, one to three hours. This precuring operation is a partial polymerization and permits a dry molding powder where the same proportions of monomer might result in a moist molding composition.

Further details of the synthesis of these new esters and of their applications will be apparent from the following examples.

*Example I*

150 grams of triethylene glycol were mixed with 1000 cc. benzene and treated with an excess of phosgene. The reaction was maintained between 0° C. and 12° C. by means of an ice bath and by regulating the rate of phosgene addition. The excess phosgene was evolved by warming slightly.

The benzene solution was washed with sodium carbonate and water and finally dried over anhydrous sodium sulphate.

The benzene solution was then added slowly over the space of one hour to a mixture of 200 grams of pyridine and 120 grams of allyl alcohol. The reaction temperature remained between +2 and +8° C. during the reaction. The benzene solution of the ester was washed with diluted HCl and with water until neutral. The ester was topped in vacuo at 2 mm. total pressure. The monomeric ester was believed to have the structure:

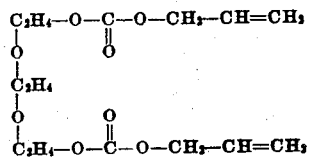

A five-gram sample was heated at 75° C. for 8 hours in the presence of 3 percent benzoyl peroxide. A hard, transparent polymer was obtained.

Example II

The reaction of Example I was repeated using methallyl alcohol in place of allyl alcohol. The ester of the following structure was obtained:

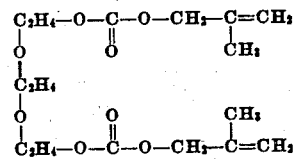

Example III

Chlorallyl chloroformate was prepared by bubbling phosgene through chlorallyl alcohol at 0° C. 155 grams of chlorallyl chloroformate so prepared was added slowly to a mixture of 200 grams of pyridine and 150 grams of triethylene glycol in 1000 cc. of carbon tetrachloride. The rate of addition was slow enough to permit the maintenance of a reaction temperature of less than 5° C. by means of a bath of salt-ice mixture surrounding the reaction flask. The solution was washed with water and with the carbon tetrachloride and other volatile impurities distilled off by heating in a vacuum. The ester was believed to have the structure:

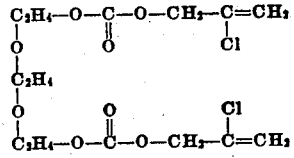

Example IV

Monomeric triethylene glycol bis (methallyl carbonate) was mixed with 5 percent benzoyl peroxide and heated at 65° C. for three hours. At this time the viscosity had increased to about 350 percent of the normal viscosity of the monomer. The thickened monomer contained about 3.4 percent benzoyl peroxide.

Two clean polished sheets of plate glass (20"x20") were clamped over a strip of ½" diameter soft rubber tubing. The rubber tubing was placed around the periphery about one inch in from the edges of the plates and the ends of the tubing were located about 2 inches apart at one corner. The plates were held together by C clamps pressing directly across the rubber tubing. The clamps were placed about 2 inches apart around the entire edge of the plate assembly and the mold was then placed in a vertical position with the open corner uppermost. The thickened monomer was poured into the mold which was permitted to stand until all of the entrained air bubbles had separated. The mold was then heated for 20 hours at a temperature of 70° C. At the end of 8 hours, 12 hours, and 16 hours, the clamps were tightened to restore the initial tension and keep the gel from shrinking from the glass plates. The polymer was removed from the mold and was found to be a hard, clear sheet except for a strip near the rubber retainer which was soft and pliable.

Example V

A 100-gram sample of the thickened monomer prepared in Example IV was mixed with 100 cc. of benzene and heated at 60° C. for 2 hours. The viscous solution was then poured into 1000 cc. of ethyl alcohol. A flocculent precipitate was formed which was washed and separated by decantation. After drying the polymer was a granular soft solid.

Five grams of the polymer was mixed with 3 percent benzoyl peroxide and pressed in a mold at 130° C. and 2000 pounds per square inch for one hour. The resin became completely polymerized to a hard, transparent, and nearly colorless solid.

Example VI

About 1000 cc. of monomeric triethylene glycol bis (allyl carbonate) was mixed with 3 percent lauryl peroxide and 300 grams of magnesium carbonate. The mixture was heated in a covered tray while passing a stream of carbon dioxide over the surface of the mixture. The temperature was maintained at 70° C. for 3 hours. The resulting mixture was a soft solid which was readily pulverized to produce a white molding powder. A 20-gram sample was mixed with one gram lauryl peroxide and pressed in a heated (135° C.) mold for 2 hours and a pressure of 1500 pounds per square inch. The product was a white opaque solid with a uniform glossy surface.

Although the invention has been described with respect to certain specific examples, it is not intended that such details of same shall be limitations except to the extent incorporated in the following claims.

This application is a continuation-in-part of Serial No. 361,280, filed October 15, 1940, and Serial No. 403,703, filed July 23, 1941, by Irving E. Muskat and Franklin Strain.

We claim:
1. Triethylene glycol bis (allyl carbonate).
2. Triethylene glycol bis (methallyl carbonate).
3. Triethylene glycol bis (chlorallyl carbonate).
4. A polymer of the ester described in claim 8.
5. A polymer of the ester described in claim 1.
6. A polymer of the ester described in claim 2.
7. A polymer of the ester described in claim 3.
8. A neutral ester having the following structural formula:

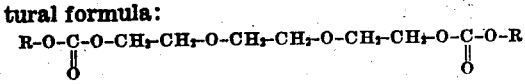

wherein R is a radical equivalent to the radical R in the alcohol ROH, said alcohol being a monounsaturated, monohydric alcohol containing from three to ten carbon atoms and having an unsaturated carbon to carbon linkage between the beta and gamma carbon atoms therein.

IRVING E. MUSKAT.
FRANKLIN STRAIN.